US012589637B2

(12) United States Patent
Snider

(10) Patent No.: US 12,589,637 B2
(45) Date of Patent: ***Mar. 31, 2026

(54) VEHICULAR REAR WINDOW ASSEMBLY WITH SYSTEM STATUS INDICATOR

(71) Applicant: Magna Mirrors of America, Inc., Holland, MI (US)

(72) Inventor: Darin J. Snider, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/211,399

(22) Filed: May 19, 2025

(65) Prior Publication Data

US 2025/0276563 A1 Sep. 4, 2025

Related U.S. Application Data

(63) Continuation of application No. 18/055,888, filed on Nov. 16, 2022, now Pat. No. 12,304,287.

(60) Provisional application No. 63/266,921, filed on Jan. 19, 2022, provisional application No. 63/264,262, filed on Nov. 18, 2021.

(51) Int. Cl.
| | |
|---|---|
| *B60J 1/18* | (2006.01) |
| *B60J 1/20* | (2006.01) |
| *B60Q 1/00* | (2006.01) |
| *B60Q 1/24* | (2006.01) |
| *B60Q 1/30* | (2006.01) |
| *B60Q 1/44* | (2006.01) |

(52) U.S. Cl.
CPC .............. *B60J 1/1853* (2013.01); *B60J 1/20* (2013.01); *B60Q 1/0023* (2013.01); *B60Q 1/247* (2022.05); *B60Q 1/30* (2013.01); *B60Q 1/44* (2013.01); *B60Q 2400/20* (2013.01)

(58) Field of Classification Search
CPC ................ B60J 1/18–1892; B60J 1/20; B60Q 1/0017–0023; B60Q 1/247–249; B60Q 1/268; B60Q 1/30–307; B60Q 1/44–549; B60Q 3/208; B60Q 3/30; B60Q 3/40; B60Q 3/74; B60Q 3/82; B60Q 9/00; B60Q 2400/20
See application file for complete search history.

(56) References Cited

U.S. PATENT DOCUMENTS 11,378,440 B2 * 7/2022 Salter ..................... G01G 19/12

* cited by examiner

*Primary Examiner* — Jason M Han

(74) *Attorney, Agent, or Firm* — HONIGMAN LLP

(57) ABSTRACT

A vehicular rear window assembly configured to be disposed at a rear portion of a cabin of a vehicle includes a fixed window panel. An indicating device is disposed at the fixed window panel and includes a light source. With the vehicular rear window assembly disposed at the rear portion of the cabin of the vehicle, the light source, when the indicating device is electrically powered, emits light. With the vehicular rear window assembly disposed at the rear portion of the cabin of the vehicle, the indicating device is operated to indicate a load of the vehicle.

17 Claims, 9 Drawing Sheets

In Spoiler, Waterproof, Low-Profile Speakers

VEHICULAR REAR WINDOW ASSEMBLY WITH SYSTEM STATUS INDICATOR

CROSS REFERENCE TO RELATED APPLICATIONS

The present application is a continuation of U.S. patent application Ser. No. 18/055,888, filed Nov. 16, 2022, now U.S. Pat. No. 12,304,287, which claims the filing benefits of U.S. provisional application Ser. No. 63/266,921, filed Jan. 19, 2022, and U.S. provisional application Ser. No. 63/264, 262, filed Nov. 18, 2021, which are hereby incorporated herein by reference in their entireties.

FIELD OF THE INVENTION

The present invention relates to a rear window assembly for a vehicle and, more particularly, a rear window assembly for a pickup truck or the like.

BACKGROUND OF THE INVENTION

It is known to provide a rear slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. The slidable window panel may be driven or moved by a cable drive system, such as described in U.S. Pat. No. 8,151,519, which is hereby incorporated herein by reference in its entirety.

SUMMARY OF THE INVENTION

A rear window assembly includes an indicating device having one or more strips or rows of light sources, such as a plurality of light emitting diodes (LEDs), such as micro-LEDs, disposed at or behind or within the fixed glass window panel of the window assembly so as to provide a flush glass window assembly with lighting viewable through the fixed glass window panel. The light sources, when electrically operated to emit light, may emit light through the window panel and exterior of the vehicle (i.e., to be visible or to illuminate a surface exterior of the vehicle) and/or interior of the vehicle (i.e., to be visible or to illuminate a surface interior of the vehicle). The light sources may be operated to indicate a status of a vehicle system, such as a payload weight indication or suspension system status indication. Optionally, the window assembly may include a plurality of indicating devices, or the indicating device may provide other indications. For example, a lighting device of the window assembly may comprise red light-emitting sources for a center high mounted stop lamp (CHMSL) of the vehicle and/or may comprise white light-emitting (or other color) light sources for a truck bed illumination function and/or may comprise white light-emitting (or other color) light sources for an interior cabin illumination function and/or or the like. The indicating device is electrically connected to a wiring harness or circuitry or user input of the vehicle when the window assembly is installed or mounted at the vehicle. The window assembly may include a touch or proximity sensor and may activate the indicating device responsive to detection by the touch or proximity sensor of a person's hand at or near the window panel or sensor.

These and other objects, advantages, purposes and features of the present invention will become apparent upon review of the following specification in conjunction with the drawings.

DESCRIPTION OF THE PREFERRED EMBODIMENTS

Figure 1:
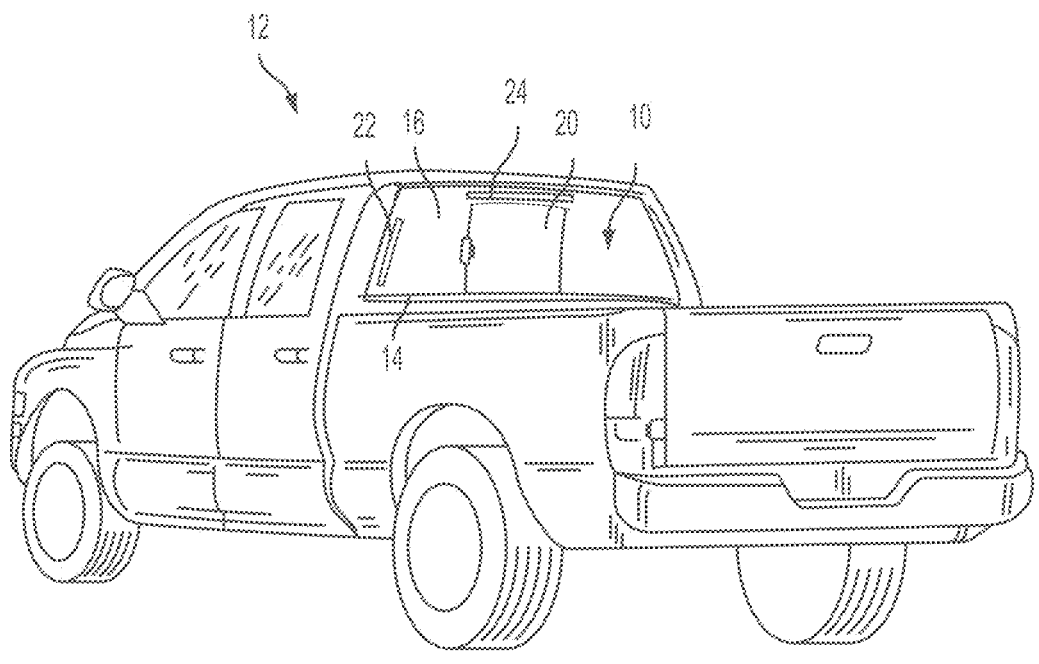
FIG. 1 is a rear perspective view of a pickup truck having a rear slider window assembly.
Figure 2:
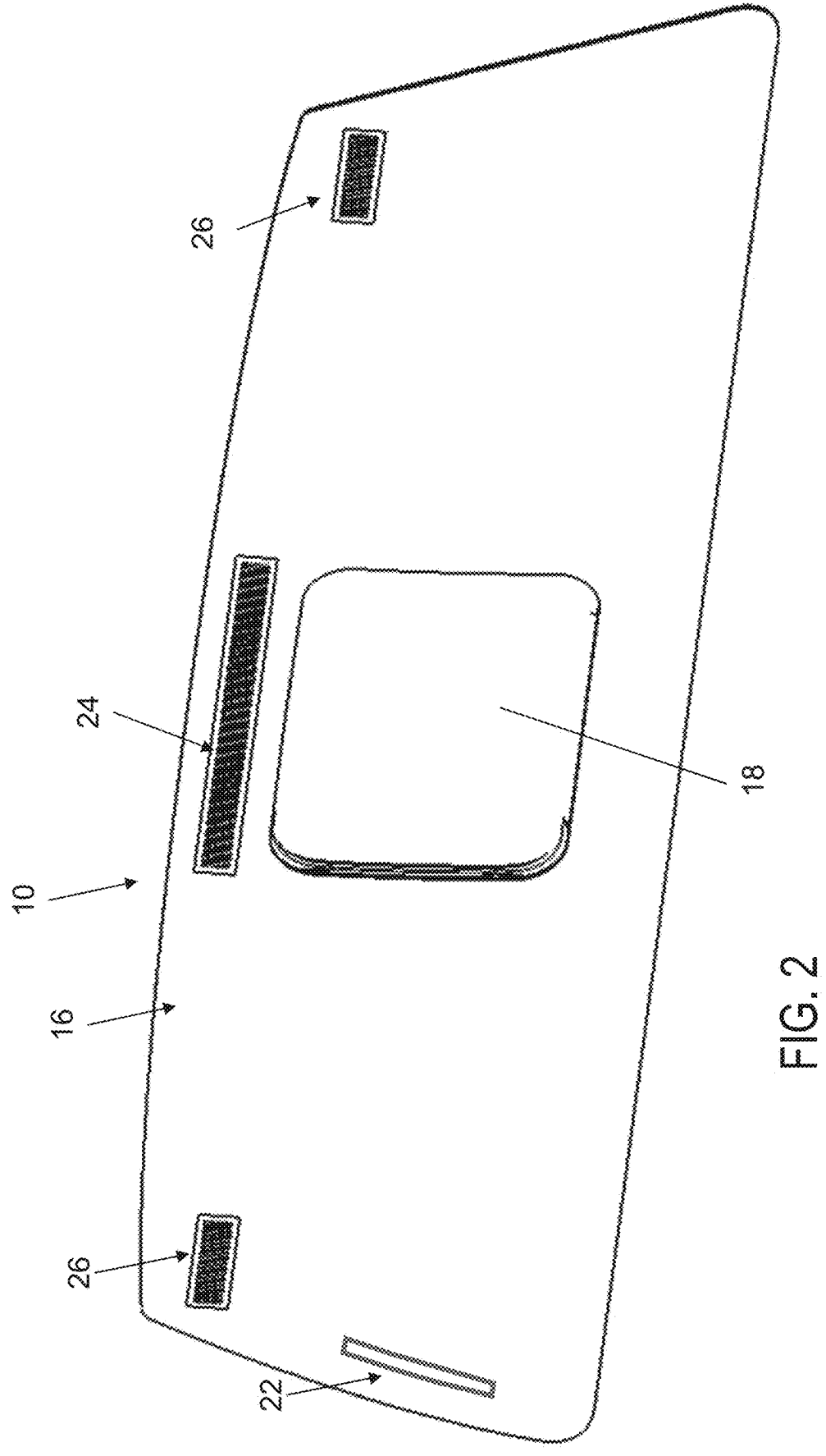
FIG. 2 is a rear perspective view of a window panel of the rear slider window assembly.
Figure 3:
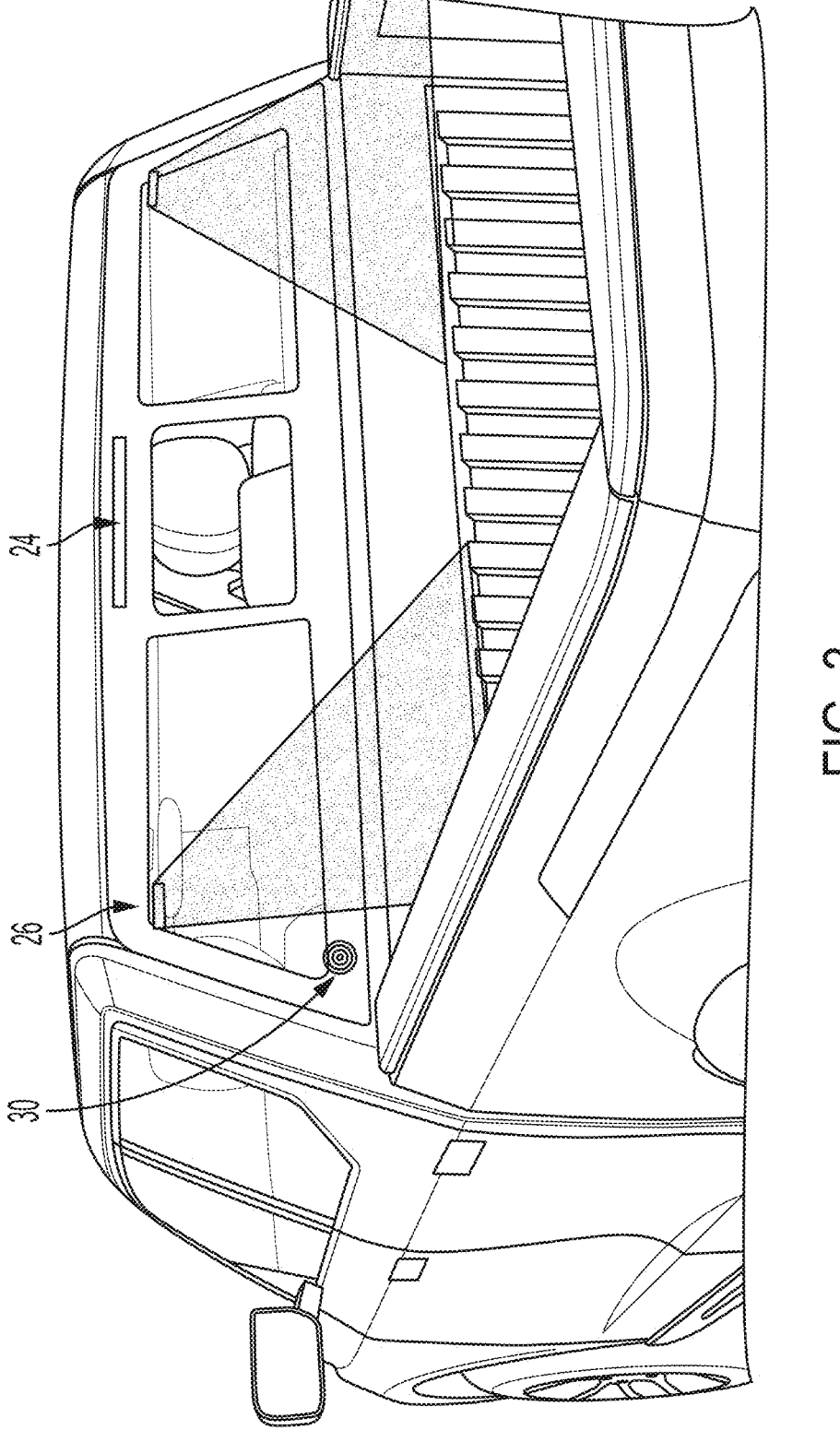
FIG. 3 is a rear perspective view of a pickup truck having another rear slider window assembly with a lighting device and a sensor.

Referring now to the drawings and the illustrative embodiments depicted therein, a rear slider window assembly 10 of a vehicle 12 (such as a pickup truck or the like) includes a window frame 14, a fixed window panel 16 having an aperture 18 that separates side window portions and a movable window panel 20 that is movable relative to the window frame 14 and the fixed window panel 16 between a closed position, where the movable window panel 20 is disposed at the aperture 18, an opened position, where the movable panel 20 is moved away from the aperture 18 and is disposed at least partially along one of the side window portions (FIGS. 1-3). The window assembly 10 includes an indicating system having an indicating device 22 disposed at the glass window panel 16, such as above and along a center region of an upper rail of the frame 14 or vertically along a side region of the window panel 16, or elsewhere at the window panel 16. The indicating device 22, when activated, emits light that is viewable through the window panel 16 at the exterior of the vehicle and/or at an interior cabin of the vehicle. That is, when light sources of the indicating device 22 are electrically operated to emit light, the light sources emit light that is viewable at and/or illuminates and/or backlights a surface exterior of the vehicle and/or interior of the vehicle. The indicating device 22 is activated or controlled responsive to a vehicle system status so that the indicating device emits light to indicate the vehicle system status (such as by emitting different color light or activating different numbers of the light sources of the indicating device or activating different light sources to backlight different icons or the like). The indicating device may be activated responsive to a user input of the window assembly (such as responsive to a touch or proximity sensor sensing presence or proximity of a person's hand). The indicating device and window assembly may utilize aspects of the window assemblies described in U.S. Pat. Nos. 10,668,868; 10,559,153; 10,427,503 and/or 9,896,026, which are hereby incorporated herein by reference in their entireties.

As shown in FIGS. 2 and 3, the window assembly 10 may include an integrated lighting device or devices, such as a center high mounted stop lamp (CHMSL) 24 for the vehicle whereby the lighting system may actuate the lighting device 24 as part of a brake light system of the vehicle 12, or the lighting device may comprise a truck bed illuminating device 26 including a plurality of white light emitting lights, whereby the lighting system may actuate the lighting device as part of a truck bed illumination system, or the lighting device may comprise a plurality of white light emitting lights whereby the lighting system may actuate the lighting device as part of an interior cabin illumination system or the like, as discussed below. Thus, the lighting device, when activated, may emit light visible through the window panel 16 and viewable at the exterior of the vehicle and/or at the interior of the vehicle. Optionally, the emitted light may illuminate an exterior portion of the vehicle and/or an interior portion of the cabin of the vehicle.

In the illustrated embodiment, the window assembly 10 comprises a hole-in-glass window configuration, where a single fixed glass panel 16 has an aperture or hole or opening 18 established therethrough to define separate spaced apart fixed window panels or panel portions, such as in a similar manner as the window assemblies described in U.S. Pat. No. 8,881,458, which is hereby incorporated herein by reference in its entirety. Optionally, the window assembly may include two fixed window panels that are spaced apart so as to define an opening 18 therebetween. The fixed window panels may comprise two separate spaced apart fixed window panels that define the opening 18 therebetween (and with upper and lower appliques or trim or filler panels or elements disposed at the upper and lower regions of the opening 18 and between the fixed window panels). Optionally, the window panel and lighting device and/or indicating device construction may be implemented on a full-pane fixed (non-slider) rear window assembly.

The frame 14 includes an upper rail and a lower rail, with the upper and lower edge regions of movable window panel 20 movably or slidably received in and along the respective upper and lower rails. The slider or movable window panel 20 is movable along the lower rail and upper rail of the frame portion 14 to open and close the aperture or opening 18. The slider window panel 20 may be disposed at a lower carrier, which may receive the lower perimeter edge region of the slider window panel 20 therein and may be slidably or movably received in the channel portion of the lower rail of the frame portion 14. The upper rail may comprise any suitable channel or rail element configured to slidably receive an upper edge portion of the movable window panel 20, and the upper rail may comprise a unitarily formed upper rail or channel.

The indicating device 22 includes a plurality of individual light sources, such as light emitting diodes (LEDs), such as micro-LEDs, or such as organic light emitting diodes (OLEDs), or such as electro-luminescent light sources, or the like, arranged in a one or more rows or columns, such as a column of LEDs vertically arranged along a side region of the fixed window panel. The indicating device and corresponding light sources may be mounted or attached or disposed in any suitable manner to emit light (when electrically operated to emit light) that is visible interior and/or exterior the vehicle. For example, the window panel 16 may include a first or inner layer or pane of glass facing the cabin of the vehicle and a second or outer layer or pane of glass facing exterior the vehicle, and the light sources may be disposed between or sandwiched between the inner and outer layers of glass and, when electrically operated to emit light, emit light through the inner layer of glass or the outer layer of glass to emit light visible, respectively, interior or exterior of the vehicle. The indicating device may be disposed at an opaque or darkened or non-light-transmitting portion of the glass panel 16, such as at or behind an opaque layer disposed at a perimeter region of the glass panel. The light sources may be positioned at locations of the glass panel that correspond to apertures or windows in the opaque layer so that light emitted by the light sources may be visible through the glass panel and wiring and other electric components may be hidden by the opaque layer.

Figure 4:
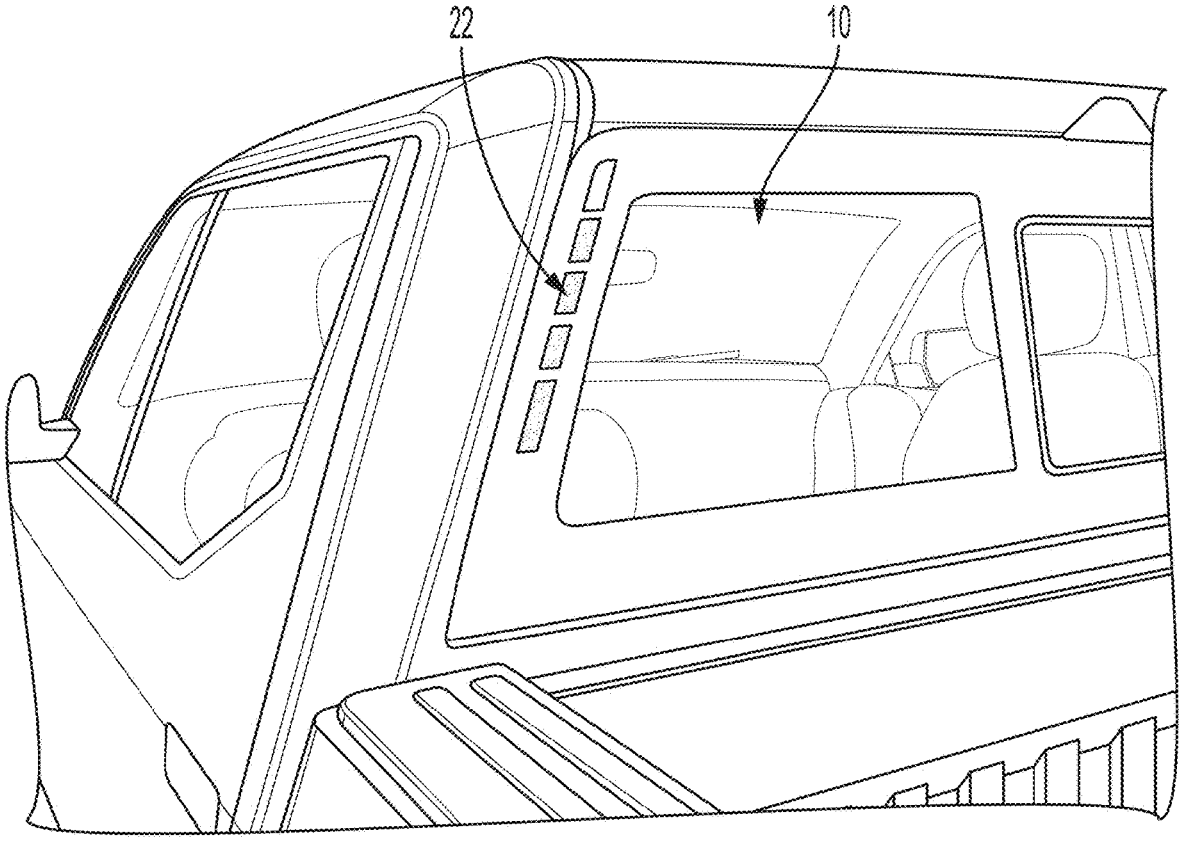
FIG. 4 is a rear perspective view of a pickup truck having another rear slider window assembly with an indicating device.
Figure 4A:
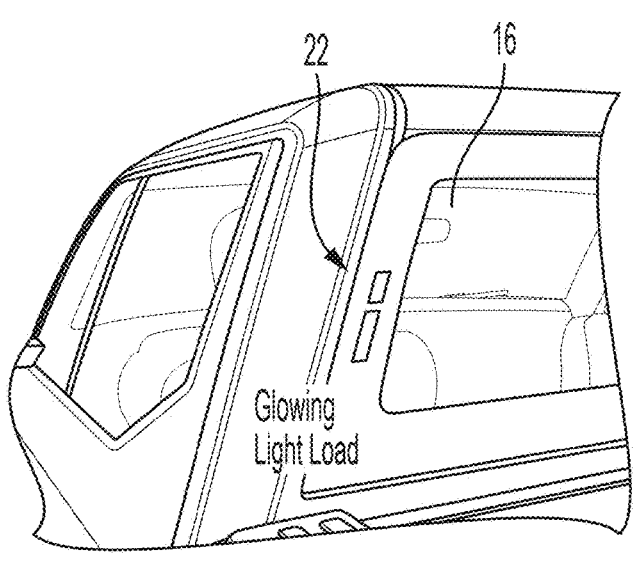
FIGS. 4A-C are perspective views of the pickup truck of FIG. 4, showing the indicating device indicating different loads in the truck bed.
Figure 4B:
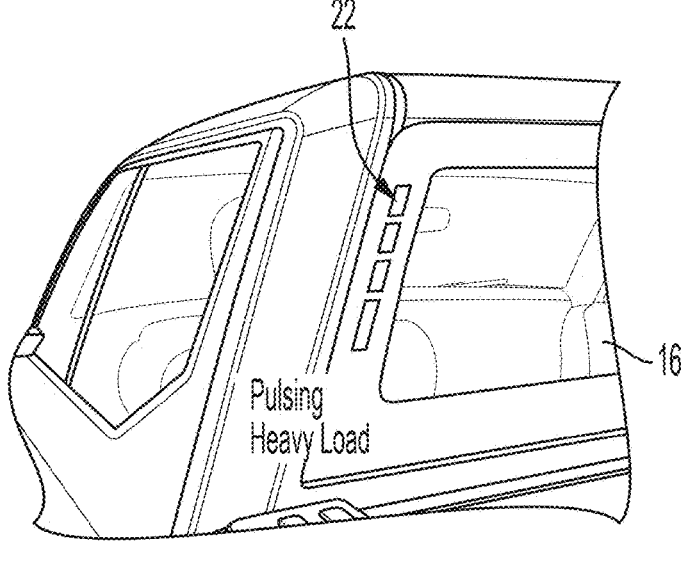
Figure 4C:
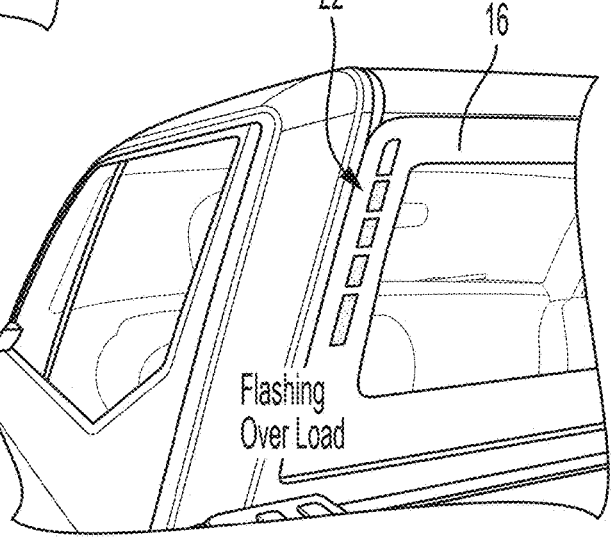

The indicating device 22 is operable to display or indicate a status of a vehicle system (such as by utilizing aspects of the display devices described in U.S. Pat. No. 10,427,503, which is hereby incorporated herein by reference in its entirety). For example, and such as shown FIGS. 4 and 4A-C, the indicating device 22 may include a plurality of light sources that form a status bar along a side or perimeter region of the window panel 16. The indicating device 22 may energize different ones of the bar elements or indicators to indicate, for example, a payload in the bed of the pickup truck. For example, a fewer number of LEDs or indicators may be energized or illuminated when the payload is light (see FIG. 4A), and more LEDs or indicators may be energized or illuminated when the payload increases to a heavier load (see FIG. 4B), and all of the LEDs or indicators may be energized and may be flashed to indicate an overloaded bed condition (see FIG. 4C). The indicators may be different colors (e.g., the lower ones may be green, the middle ones may be yellow, and the upper one or ones may be orange or red) to indicate lower, higher and overloaded payload conditions. The indicating device 22 may be controlled responsive to an output of a suspension system (indicating amount of compression of the suspension system that is indicative of increase in payload) or a scale system that determines payload at the truck bed or the like.

Optionally, the window assembly may also or otherwise include a touch or proximity sensor 28 (FIG. 5) disposed at the window panel 16, such as at the exterior facing surface of the window panel, and that senses a person's touch or senses proximity of a person's hand and actuates the indicating device and/or a lighting device of the window assembly. For example, the touch or proximity sensor 28 may, responsive to sensing a person's hand, actuate the truck bed illumination lights. Optionally, the touch or proximity sensor 28 may be operable to trigger or actuate the payload indicator or other indicator of the window or vehicle. Optionally, the touch or proximity sensor 28 may be operable to trigger or actuate a door lock mechanism of the vehicle to unlock the vehicle doors or may unlock/lock and/or open/close the movable window panel 20 of the rear slider window, or may provide other control features for the window assembly and/or the vehicle. The sensing region of the window panel (i.e., the location of the window panel at and/or near the sensor 28) may be illuminated or backlit (and may have an icon indicative of the sensor) or otherwise demarcated so that a user can readily identify where the user needs to place his or her hand to activate the sensor 28. Optionally, multiple sensors may be provided at the window assembly that provide different control functions.

Figure 5:
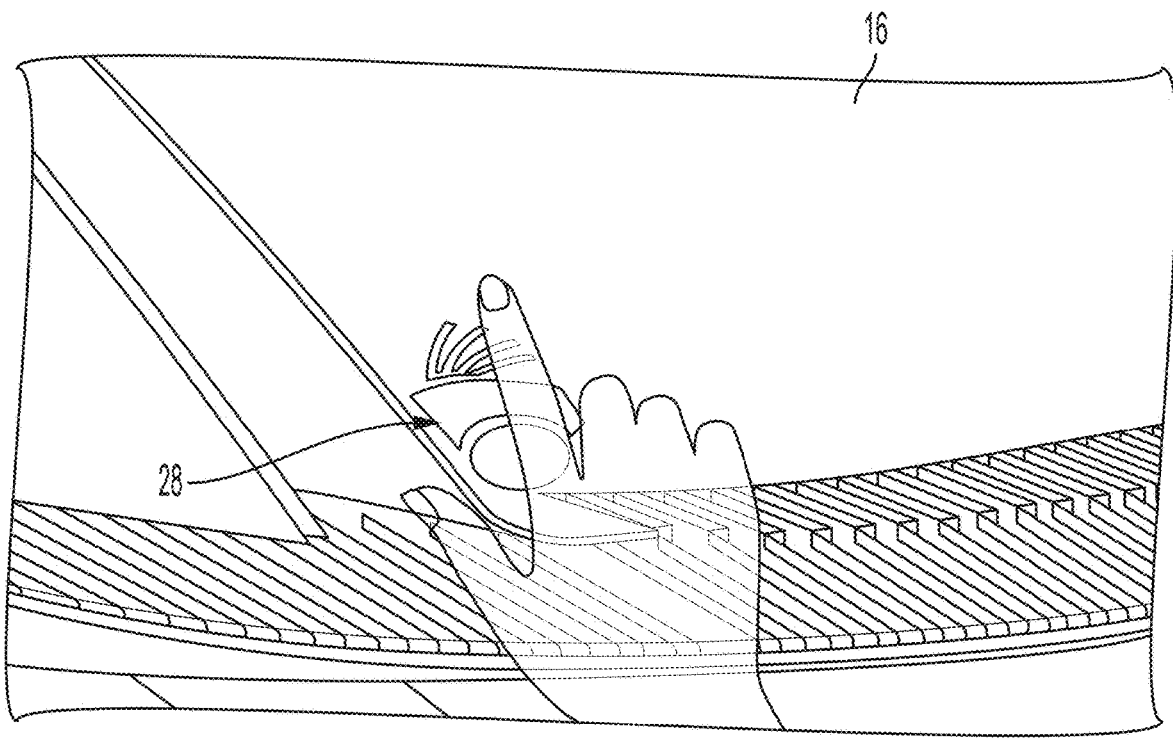
FIG. 5 is a perspective view of a rear liftgate having a touch or proximity sensor.
Figure 6:
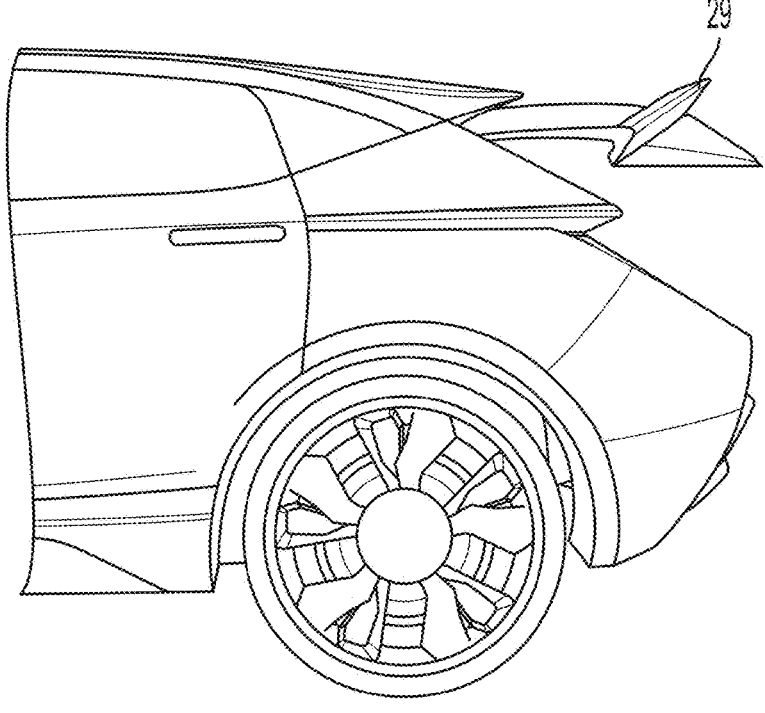
FIG. 6 is a side view of the vehicle and rear liftgate.
Figure 7:
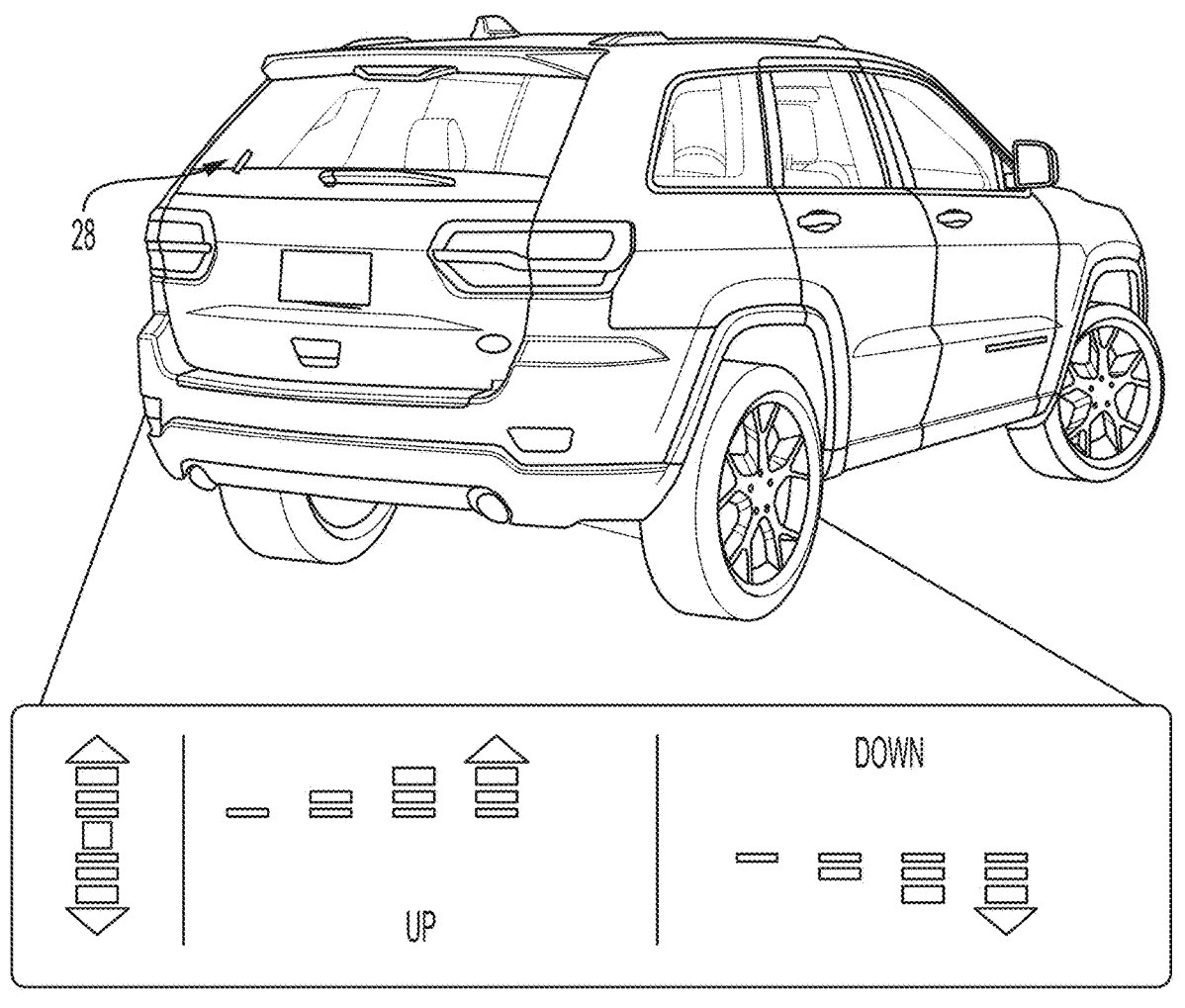
FIG. 7 is a perspective view of another vehicle with a rear liftgate having a touch or proximity sensor.

Optionally, and such as shown in FIGS. 5-7, the touch or proximity sensor 28 may be incorporated or integrated in a rear liftgate 29 of a vehicle, such as integrated with or disposed at the rear window panel of the rear liftgate 29. Thus, responsive to touch or proximity of a person's hand at the sensor 28 (see FIG. 5), the liftgate may be opened or closed (see FIG. 6).

Optionally, the sensor 28 may include gesture sensing capabilities so that the device can detect an authorized user's (such as a person carrying a key fob for the vehicle) hand wave or other gesture, and can unlock/lock the liftgate or open/close the liftgate accordingly (and/or generate other outputs to perform other functions responsive to recognition of the user's gesture). For example, the sensing device may include one or more other sensors (such as proximity sensors or radar sensors or imaging sensors or the like) that are disposed behind and view or sense through an aperture or window of the non-light-transmitting layer, so as to sense the presence and movement of a person's hand or the like at or near the door or window. The sensor 28 may be disposed at a different or remote window of the opaque layer different than the window corresponding to the light sources of the indicating device 22. The sensor or sensing device may utilize aspects of the devices described in U.S. Pat. No. 10,559,153 and/or U.S. Publication No. US-2018/0094471, which are hereby incorporated herein by reference in their entireties.

Figure 8:
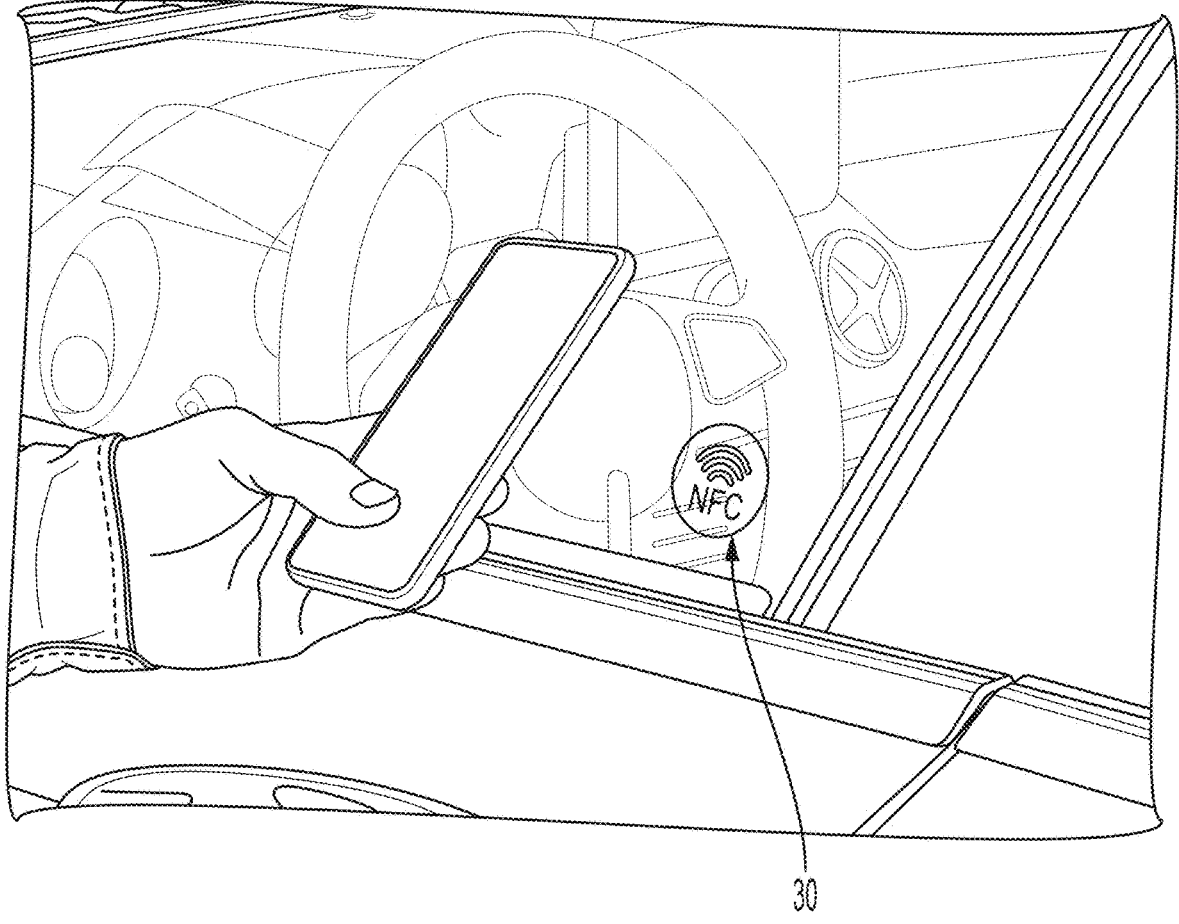
FIG. 8 is a perspective view of a vehicle window with an NFC sensor disposed thereat.

Optionally, the window assembly may include a near field communication (NFC) device or sensor 30 (FIG. 8), so that a user may place a smart phone or other transmitting device at or near the sensor 30 to unlock/lock the vehicle doors or to provide any other function at the window assembly and/or vehicle. The NFC sensor 30 may be disposed at the rear window or at a rear liftgate window or at a side window of the vehicle, where it is readily accessible by a user when the user approaches the vehicle. The NFC sensor may unlock the door upon detecting presence of an authorized device (e.g., the vehicle owner's smartphone) at or near the NFC sensor.

The indicating device 22, lighting devices 24, 26 and/or sensors 28, 30 includes an electrical lead or wire or conductive trace that extends from the window assembly 10 for electrical connection to a vehicle wire harness when the window assembly 10 is installed at a vehicle 12. For example, a surface of the inner glass panel may have electrically conductive traces established thereat, whereby electrical connection of the indicating device 22 to the electrically conductive traces is made when the indicating device 22 is disposed at the glass panel, with the electrically conductive traces extending along the glass panel to a perimeter region of the window panel 16 for electrical connection to a vehicle wire harness or the like. The indicating device may utilize aspects of the lighting devices described in U.S. Pat. No. 10,559,153 and/or 10,427,503, and/or U.S. Publication No. US-2021/0296530, which are hereby incorporated herein by reference in their entireties.

The indicating device and lighting device(s) and sensor(s) are integrated in the window panel 16, such that the window panel 16 (with the devices integrated therein) is installed at the vehicle as a unit, whereby the devices are electrically connected to a vehicle wire harness or the like for power and control (such as by an electronic control module or the like of the vehicle at which the window assembly is installed). When the indicating device 22 or lighting devices are not activated, the devices are covert and not readily discernible at the window panel 16 (due to the tint or darkening of the window panel or due to a transparent characteristic of the device itself when it is not energized). Optionally, the sensor may be demarcated via an icon or symbol at the window, such as a glass etching or film or adhesive, and may not be readily discernible unless the icon or demarcation is illuminated or backlit (such as via energizing a light source of the sensor assembly).

Therefore, the rear window assembly for a pickup truck has one or more devices integrated therein. The rear window assembly thus has a smooth exterior appearance and avoids use of a lens on the sheet metal and an applique on the glass panel. The window assembly provides a single modular system that eliminates the need for two or more separate assemblies in the assembly plant. The window assembly provides a reduction of labor and complexity of installation at the vehicle assembly plant, and may eliminate labor at the assembly plant for installing a separate center high mounted stop lamp (CHMSL).

Figure 9:
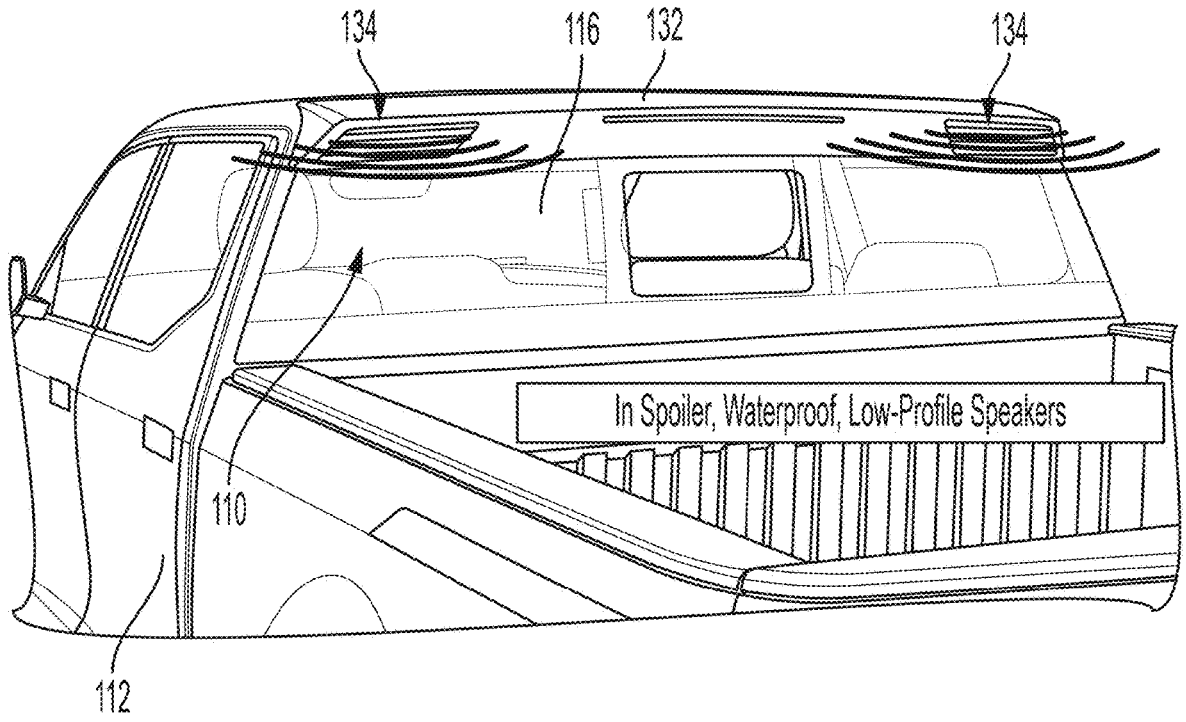
FIG. 9 is a perspective view of a vehicle with speakers integrated at the rear window or spoiler of the vehicle.

Optionally, the rear window assembly (or a spoiler of the vehicle at the rear window assembly) may include one or more speakers, such as audio speakers that generate sound responsive to an audio system of the vehicle. For example, and with reference to FIG. 9, a spoiler 132 at a vehicle 112 (shown as a spoiler along an upper region of a rear slider window assembly 110 of a pickup truck) includes a pair of waterproof, low-profile speakers 134. The spoiler may be part of the vehicle cab or may be integrated with the rear window assembly 110 (such as by utilizing aspects of the window assemblies and spoilers described in U.S. Publication No. US-2022/0097495, which is hereby incorporated herein by reference in its entirety).

The speakers 134 may be electrically connected to an audio system of the vehicle and/or may wirelessly connect (such as via BLUETOOTH® connection) to the audio system of the vehicle or to a user's mobile device. In the illustrated embodiment, the speakers are integrated in the spoiler 132 and along a rearward and downward facing side or surface of the spoiler so as to emit sound downward and rearward of the cab of the vehicle. Optionally, the speakers may be otherwise arranged to emit sound in other directions. Optionally, the speakers may be disposed at the fixed window panel 116 of the window assembly 110 (such as attached at the exterior side of the fixed window panel or otherwise attached and protruding partially through an aperture through the fixed window panel). Optionally, the speakers may be disposed at a perimeter frame or encapsulation that extends at least partially around the fixed window panel. Optionally, the window assembly (or spoiler or rear truck bed panel or other exterior part of the vehicle) may include a user actuatable device that controls the sound system and speakers so that a user can control volume and track selection or tuning of the sound system at the rear of the vehicle. For example, a touch or proximity sensor disposed at the glass window panel may be operable to control operation of the sound system and speakers of the vehicle.

The movable or slider window panel may be movable such as via manual pushing or pulling at the window panel and preferably is movable in response to actuation of a drive motor of the drive motor assembly or system, which may move cables or wires of cable assemblies relative to the sheath of the cable assemblies to impart horizontal movement of the carrier and slider window panel along the upper and lower rails. Optionally, the drive motor assembly and rail configurations may utilize aspects of the drive assemblies of the types described in U.S. Pat. Nos. 4,920,698; 4,995,195; 5,146,712; 5,531,046; 5,572,376; 6,955,009; 7,073,293; 8,151,519 and/or 8,938,914, and/or U.S. Publication Nos. US-2019/0383084; US-2017/0356231; US-2004/0020131 and/or US-2008/0127563, which are all hereby incorporated herein by reference in their entireties.

Optionally, the fixed window panel or panels may include an electrically conductive heater grid or other heating element or electrically operable element established at the window panel or panels (such as at or on an interior surface of the window panel) and the movable window panel may include an electrically conductive heater grid or other heating element or electrically operable element established at the movable window panel (such as at or on an interior surface of the movable window panel). Optionally, the heater grids may also be laminated within the fixed window panel and/or the movable window panel, such as by utilizing aspects of the window assemblies described in U.S. Pat. No. 10,524,313, which is hereby incorporated herein by reference in its entirety. The heater grids are electrically conductively connected to (or are otherwise in electrical conductive continuity with) a power source of the vehicle and may be powered (such as responsive to a user actuatable input or switch or button of the vehicle or responsive to a sensor or accessory of the vehicle) to heat or defrost or defog the fixed window panels. The movable panel heater grid is electrically connected to the power source (and may be electrically connected to electrical terminals or elements at one of the heater grids of the fixed window panels) and may be electrically powered to heat or defrost or defog the movable window panel. The heater grids comprise a plurality of electrically conductive traces that extend across the respective window panels between respective busbars to provide enhanced and more uniform heating and defrosting/defogging of the window panel. The heater grid of the movable window panel may be powered in a manner that allows for heating or defogging or defrosting of the movable window panel irrespective of whether the movable window panel is opened or partially opened or closed. For example, the electrical connections may be made via a flexible electrical connector or wire or cable or the like, such as by utilizing aspects of the rear slider window assemblies described in U.S. Pat. Nos. 9,579,955, 8,938,914, 8,881,458 and/or 8,402,695, and/or U.S. Publication No. US-2018/0079379, which are hereby incorporated herein by reference in their entireties. Optionally, the heater grid of the movable window panel may be powered only when in its closed position and/or via any suitable powering means. Optionally, a lighting device or indicator device or sensor may be integrated in or at the movable sliding window panel and electrically powered via similar or shared electrical connection as that used to electrically power the heater grid of the movable window panel, such as a flexible or sliding electrical connector.

The benefits of embodiments of the window assemblies described herein may also be realized in vehicular movable window assemblies other than a rear window assembly for a pickup truck or the like, such as (for example) a slider window assembly suitable for use as a movable side window for a vehicle such as a van or a bus or other vehicular window assembly. The window construction with indicator and/or lighting device and/or sensor may provide brake lighting, cargo lighting and/or interior lighting, and/or may provide other exterior lighting, such as puddle lamps or the like, via light sources (such as LEDs, micro-LEDs, OLEDs or electro-luminescent light sources or the like) at a fixed or movable glass window panel of a vehicle, such as for a rear window or rear liftgate or side window or other window of a vehicle.

Optionally, the window assembly or assemblies may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/ or 6,691,464, and/or U.S. Publication Nos. US-2014/0047772; US-2006/0107600; US-2008/0127563; US-2004/0020131 and/or US-2003/0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A vehicular rear window assembly, the vehicular rear window assembly comprising:

a fixed window panel;

an indicating device disposed at the fixed window panel, wherein the indicating device comprises a light source;

wherein the vehicular rear window assembly is configured to be disposed at a rear portion of a cabin of a vehicle;

wherein, with the vehicular rear window assembly disposed at the rear portion of the cabin of the vehicle, the light source, when the indicating device is electrically powered, emits light;

wherein, with the vehicular rear window assembly disposed at the rear portion of the cabin of the vehicle, the indicating device is operated to indicate a load of the vehicle; and a touch or proximity sensor that senses touch or presence of a person's hand at an exterior region of the fixed window panel, wherein, responsive to sensing touch or presence of a person's hand, the touch or proximity sensor generates an output to activate the indicating device.

2. The vehicular rear window assembly of claim 1, wherein, with the vehicular rear window assembly disposed at the rear portion of the cabin of the vehicle, the indicating device is disposed at an upper central region of the fixed window panel.

3. The vehicular rear window assembly of claim 1, wherein, with the vehicular rear window assembly disposed at the rear portion of the cabin of the vehicle, the indicating device is disposed at a side region of the fixed window panel.

4. The vehicular rear window assembly of claim 1, wherein, with the vehicular rear window assembly disposed at the rear portion of the cabin of the vehicle, the light source, when the indicating device is electrically powered, emits light that is visible through the fixed window panel so as to be viewable by a person viewing the vehicular rear window assembly from exterior and rearward of the vehicle.

5. The vehicular rear window assembly of claim 1, wherein, with the vehicular rear window assembly disposed at the rear portion of the cabin of the vehicle, the indicating device is operated responsive to a system of the vehicle, and wherein, responsive to an output of the system, the indicating device adjusts operation of the light source to indicate a status of the system of the vehicle.

6. The vehicular rear window assembly of claim 5, wherein the light source is operated to illuminate an icon to indicate the status of the system of the vehicle.

7. The vehicular rear window assembly of claim 5, wherein the system comprises a suspension system of the vehicle.

8. The vehicular rear window assembly of claim 1, wherein the indicating device comprises a plurality of light sources, and wherein, with the vehicular rear window assembly disposed at the rear portion of the cabin of the vehicle, and when the indicating device is electrically powered, individual light sources of the plurality of light sources emit light.

9. The vehicular rear window assembly of claim 8, wherein the indicating device adjusts a number of individual light sources of the plurality of light sources that emit light to indicate the load of the vehicle.

10. The vehicular rear window assembly of claim 8, wherein, with the vehicular rear window assembly disposed at the rear portion of the cabin of the vehicle, the plurality of light sources are arranged vertically along a side region of the fixed window panel.

11. The vehicular rear window assembly of claim 1, wherein the light source comprises one selected from the group consisting of (i) a light emitting diode (LED), (ii) an organic light emitting diode (OLED), and (iii) an electro-luminescent light source.

12. The vehicular rear window assembly of claim 1, wherein the fixed window panel comprises an opaque layer at a region of the fixed window panel corresponding to the indicating device.

13. The vehicular rear window assembly of claim 1, wherein the vehicular rear window assembly is configured to be disposed at a rear portion of a cabin of a pickup truck.

14. The vehicular rear window assembly of claim 13, wherein the vehicular rear window assembly comprises a vehicular rear slider window assembly comprising a movable window panel and a frame portion having an upper rail and a lower rail, and wherein the fixed window panel is fixed relative to the frame portion, and wherein the fixed window panel comprises an opening, and wherein the movable window panel is movable along the upper rail and the lower rail, and wherein the movable window panel is movable between a closed position, where the movable window panel is disposed at the opening, and an opened position, where the movable window panel is disposed at least partially along the fixed window panel.

15. A vehicular rear slider window assembly, the vehicular rear slider window assembly comprising:

a frame portion having an upper rail and a lower rail;

a fixed window panel that is fixed relative to the frame portion, wherein the fixed window panel at least in part defines an opening;

a movable window panel that is movable along the upper rail and the lower rail, wherein the movable window panel is movable between (i) a closed position where the movable window panel is disposed at the opening and (ii) an opened position where the movable window panel is disposed at least partially along the fixed window panel;

an indicating device disposed at the fixed window panel, wherein the indicating device comprises a light source;

wherein the vehicular rear slider window assembly is configured to be disposed at a rear portion of a cabin of a pickup truck;

wherein, with the vehicular rear slider window assembly disposed at the rear portion of the cabin of the pickup truck, the indicating device is disposed at an upper central region of the fixed window panel;

wherein, with the vehicular rear slider window assembly disposed at the rear portion of the cabin of the pickup truck, the light source, when the indicating device is electrically powered, emits light;

wherein, with the vehicular rear slider window assembly disposed at the rear portion of the cabin of the pickup truck, the indicating device is operated to indicate a load of the pickup truck; and wherein, with the vehicular rear slider window assembly disposed at the rear portion of the cabin of the pickup truck, the light source, when the indicating device is electrically powered, emits light that is visible through the fixed window panel so as to be viewable by a person viewing the vehicular rear slider window assembly from exterior and rearward of the pickup truck.

16. The vehicular rear slider window assembly of claim 15, wherein the indicating device comprises a plurality of light sources, and wherein, with the vehicular rear slider window assembly disposed at the rear portion of the cabin of the pickup truck, and when the indicating device is electrically powered, individual light sources of the plurality of light sources emit light, and wherein the indicating device adjusts a number of individual light sources of the plurality of light sources that emit light to indicate the load of the pickup truck.

17. A vehicular rear window assembly, the vehicular rear window assembly comprising:

a fixed window panel;

an indicating device disposed at the fixed window panel, wherein the indicating device comprises a light source;

wherein the vehicular rear window assembly is configured to be disposed at a rear portion of a cabin of a vehicle;

wherein, with the vehicular rear window assembly disposed at the rear portion of the cabin of the vehicle, the light source, when the indicating device is electrically powered, emits light;

wherein, with the vehicular rear window assembly disposed at the rear portion of the cabin of the vehicle, the indicating device is operated to indicate a load of the vehicle; and wherein, with the vehicular rear window assembly disposed at the rear portion of the cabin of the vehicle, the light source, when the indicating device is electrically powered, emits light toward an interior portion of the cabin of the vehicle so as to be viewable by a driver of the vehicle.

* * * * *